July 26, 1960  R. H. FARCHMIN  2,946,085
SCRAPER FOR HOG DEHAIRING MACHINE
Filed May 20, 1958

INVENTOR.
Roy H. Farchmin
BY
ATTORNEY.

United States Patent Office 2,946,085
Patented July 26, 1960

2,946,085

SCRAPER FOR HOG DEHAIRING MACHINE

Roy H. Farchmin, 9819 Jarboe St., Kansas City, Mo.

Filed May 20, 1958, Ser. No. 736,570

4 Claims. (Cl. 17—18)

This invention relates to apparatus for dehairing and cleaning the skins of animals such as hogs and more particularly, to an improved scraper unit mounted on the power operated rotor assembly forming a part of the apparatus and located adjacent the carcass support.

It is the most important object of the present invention to provide a scraper unit adapted to be mounted on the rotor assembly of a hog dehairing machine and including elongated scraper blades engageable with the carcass during rotation of the assembly, and constructed of relatively flexible spring material so that the blades bend and flex during engagement of the same with the animal carcass to materially increase the efficiency of the dehairing operation without producing deleterious results on the carcass itself.

Another important object of the instant invention is to provide an improved scraper unit as referred to above, wherein the flexible blades are secured to one end of a yieldable body in turn mounted on the rotor assembly of the machine, and which body has the property of returning relatively slowly to its initially planar position after flexing of the same so that, upon rotation of the rotor assembly and engagement of the flexible blades with the carcass to dehair the same, the yieldable body serves to dampen the vibrations of the blades upon disengagement of the latter from the surface of the animal carcass, thereby materially decreasing the vibration produced during operation of the machine and eliminating vibration of the blades during the period between disengagement of the blades from the carcass and reengagement of the same as the rotor assembly is rotated.

An equally important object is to provide a dehairing machine wherein is included a pair of parallel, highly flexible, primary blades secured to the outer end of the slowly yieldable body, as well as a secondary scraper blade located in bridging relationship to the primary blades and having an arcuate, carcass-engaging segment disposed between the outer end of the yieldable body and the skin-engaging sections of the primary blades so that, upon rotation of the rotor assembly the outermost portions of the primary and secondary blades successively engage the carcass to dehair the same.

Also an important object of this invention is to provide a dehairing machine wherein the scraper units, including a slowly yieldable body having a number of highly flexible scraper blades secured to the outer end thereof, are mounted on the rotor assembly in substantially tangential relationship to the latter so that maximum scraping engagement of the blades with the carcass is obtained during rotation of the assembly.

Another important aim is to provide structure on the rotor assembly limiting yielding movement of the body mounting the scraper blades so that the blades are maintained in maximum engagement with the carcass during rotation of the assembly.

An important object of this invention is to provide an animal dehairing machine as referred to above wherein the primary blades are of such length and material that they may flex independently and exhibit sufficient torsional action to conform with the outer skin surface of the animal upon engagement of the blades with the same, regardless of the uneven configuration of such surface of the animal.

Other important objects, advantages and salient features of the present invention will be obvious or be explained more fully when considering the accompanying drawing, wherein.

Figures 1, 2, 3:
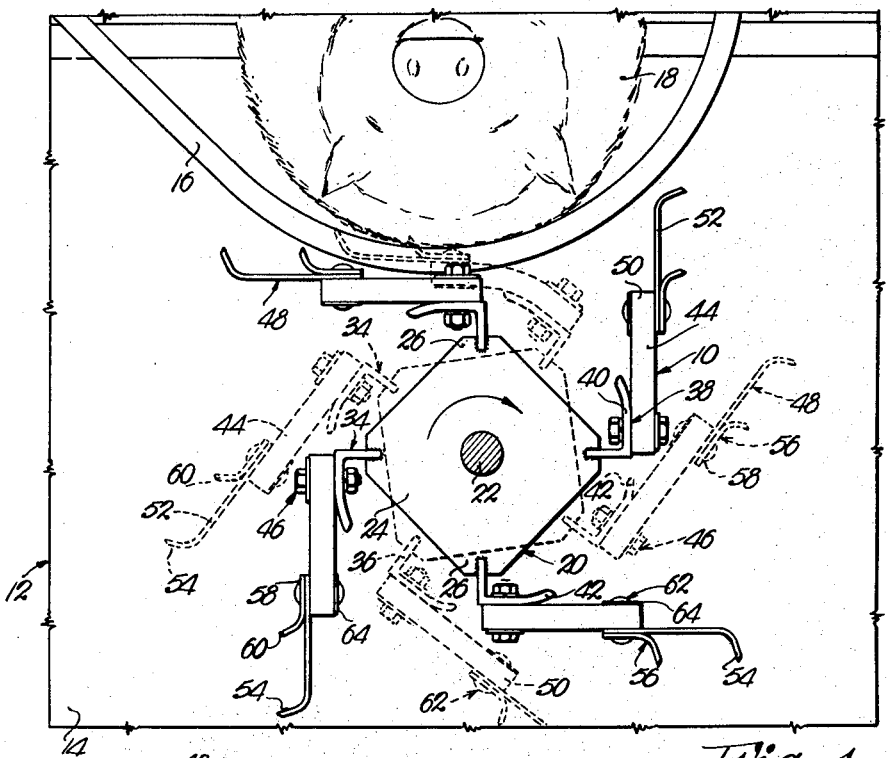
Figure 1 is a fragmentary, side elevational view of a hog dehairing machine incorporating the novel scraper units of the present invention, certain parts being broken away and in section to reveal details of construction.
Fig. 2 is an enlarged, fragmentary, plan view of one of the improved scraper units forming the subject matter of the instant invention and showing the same mounted in place on the rotor assembly.
Fig. 3 is a fragmentary, enlarged, cross-sectional view taken on the line 3—3 of Fig. 2 with the flexed positions of the components being illustrated in dotted lines.

Briefly, the present invention comprises an improved scraper unit adapted to be mounted on the rotor assembly of a hog dehairing machine and provided with a slowly yieldable body mounted on the rotor assembly for rotation therewith having a plurality of highly flexible scraper blades secured to the outermost end of the same in positions to engage the animal carcass during rotation of the assembly. Inasmuch as the scraper blades are much more flexible than the yieldable body, upon disengagement of the scraper blades from the carcass during rotation of the assembly, the yieldable body dampens the vibrations of the scraper blades and thus, decreases vibration of the entire machine and serves to completely eliminate vibration of such blades during the time between disengagement of the blades from the carcass and reengagement of such blades during rotation of the assembly.

Scraper units constructed in accordance with the preferred concepts of the present invention are designated generally by the numeral 10 and are particularly adapted to be utilized in a conventional hog dehairing machine 12. Framework 14 of machine 12 mounts a grate-like table or support 16 upon which the carcass 18 of a hog or other animal to be scraped may be supported, as well as a rotor assembly 20 disposed directly beneath support 16 for rotation about a horizontal shaft 22 turned by suitable prime mover means (not shown).

Assembly 20 includes a polygonal member 24 secured to shaft 22 for rotation therewith and although member 24 may be of any suitable configuration, the one chosen for illustration is square to present four corners 26, each having a scraper unit 10 constituting the present invention mounted thereon and extending outwardly therefrom.

Each scraper unit 10 includes a substantially L-shaped element 34 provided with a leg 36 suitably secured as by welding or the like to respective corners 26 of member 24 and an integral leg 38 extending outwardly from leg 36, it being noted that each of the legs 38 has an inner portion 40 at right angles to respective legs 36 and an outer portion 42 bent along a transverse line in a direction toward leg 36 thereof. The angularity of outer portion 42 of leg 38 with respect to inner portion 40 thereof is clearly indicated in Fig. 3 of the drawing.

One end of a body 44 formed of yieldable material is secured to inner portion 40 of each of the legs 38 of elements 34 by bolt and nut means 46 passing through body 44 and inner portion 40 of leg 38. The material from which body 44 is constructed may vary but it is particularly contemplated that the material be of rubber or similar substance having a relatively high modulus of elasticity. Fillers or reinforcing substances may be incorporated into the material from which body 44 is constructed in order to increase the defined modulus thereof but, in any event, it is to be noted that body 44 preferably has the inherent characteristic of flexing under application of force in a direction intersecting the major plane thereof, and thereafter relatively slowly returning to its normal planar position, as illustrated in Fig. 3.

A pair of identical, primary, relatively narrow scraper blades 48 are secured to the end 50 of body 44 in parallel, spaced relationship and lying in a common plane substantially coplanar with the major face of body 44 away from element 34. Each of the blades 48 has a relatively flat major portion 52 extending outwardly from body 44 and having a laterally extending, arcuate, terminal section 54 at the free end thereof projecting away from the major plane of portion 52 away from member 24. Arcuate sections 54 on the blades 48 on each body 44 are preferably transversely aligned as shown in Fig. 2.

A secondary scraper blade 56 is mounted on each of the bodies 44 in bridging relationship to respective primary blades 48 and includes a planar portion 58 overlying the flat major portion 52 of blades 48. Laterally extending segment 60 forming a part of each of the secondary scraper blades 56 projects away from the major portions 52 of blades 48 in the same direction as sections 54. Means for securing primary blades 48 and secondary blade 56 to each of the bodies 44 includes elongated rivet means 62 passing through respective blades 48 and 56 and ends 50 of bodies 44, it being preferable to provide bearing plate means 64 on the major faces of bodies 44 opposed to blades 48 and 56 to prevent rivet means 62 from pulling out of bodies 44.

Each of the scraper blades 48 is preferably constructed of relatively flexible material such as spring steel so that after flexing of blades 48, the same reassume their normal position as illustrated in Fig. 3 relatively quickly upon release of the same.

It can be perceived that because of the way in which each of the bodies 44 is mounted on inner portion 40 of legs 38 of elements 34, which are in turn secured to respective corners 26 of member 24, bodies 44 and in turn blades 48 and 56 are disposed substantially tangential to a circular arc defined by inner portion 40 of elements 34 secured to member 24. It is to be further pointed out that table or support 16 is positioned in sufficient proximity to assembly 20 to cause sections 54 of blades 48 and segments 60 of blades 56 to engage the skin of carcass 18 upon rotation of assembly 20.

As assembly 20 is rotated and units 10 revolve therewith, it can be ascertained that the segment 60 of one of the secondary blades 56 initially moves into engagement with and scrapes the skin of carcass 18, whereupon continued rotation of member 24 about the axis of shaft 22 causes segment 60 to move out of engagement with carcass 18, followed by subsequent engagement of sections 54 of primary blades 48 in scraping engagement with carcass 18.

The flexibility of blades 48 permits the same to bend as the sections 54 engage the outer skin of carcass 18, and it has been determined that flexing of blades 48 during scraping engagement of sections 54 with the animal carcass causes the hair on carcass 18 to be more efficiently removed. As soon as sections 54 of the primary blades 48 on a particular unit 10 move out of engagement with carcass 18 during rotation of assembly 20, the inherent springiness of major portions 52 of blades 48 causes the latter to tend to vibrate but yieldable body 44 immediately dampens this vibration to such an extent that the blades have ceased movement relative to member 24 before such blades are brought into reengagement with carcass 18 as assembly 20 rotates. Furthermore, body 44 of each of the units 10 dampens vibration of flexible blades 48 to such an extent that vibration of the entire machine 12 is virtually eliminated, despite the inherent characteristics of blades 48 to vibrate upon release of the same from carcass 18.

Outer portions 42 of elements 34 also limit the degree of flexing of bodies 44 so that sections 54 of blades 48 and segment 60 of blade 56 are maintained in firm scraping engagement with carcass 18 throughout the time that each unit 10 is rotated in proximal relationship to carcass 18.

Another important feature of this invention is the disposition of units 10 in substantially tangential relationship to member 24 of assembly 20 so that sections 54 and segment 60 of blades 48 and 56 respectively are maintained in scraping engagement with the outer skin of carcass 18 for a maximum period of time during rotation of member 24 about the axis of shaft 22.

It can be appreciated that because of the inherent resiliency of blades 48, the same may flex independently and exhibit torsional action sufficient to conform with the outer skin of animal 18 upon engagement of the blades 48 with the same and during scraping action of lateral sections 54 regardless of the uneven surface configuration of animal 18.

Having thus described the invention what is claimed as new and desired to be secured by Letters Patent is:

1. A paddle for use in a hog dehairing machine or the like, comprising a normally flat, elongated, flexible, resilient, rubber-like body having opposite end portions, said body having attaching means operatively associated with one end portion thereof; and at least one flexible, resilient, elongated blade member attached to the opposite end portion of said body, said blade being of substantially the same length as that of said body and having an arcuate terminal portion on its free end, whereby a substantial portion of the flexing of said paddle is assumed by said blade.

2. A paddle as set forth in claim 1 wherein said blade is of spring steel and thereby resistant to assuming a set therein upon flexing of the same longitudinally thereof.

3. A paddle as set forth in claim 1 wherein is provided at least a pair of said blades attached to said opposite end portion of the body, said blades being positioned with the major lengths thereof in substantially parallel relationship and said terminal portions of the blades extending away from said major lengths of respective blades in one direction.

4. A paddle as set forth in claim 3 wherein said blades are independently flexible and are of sufficient length and resiliency to exhibit torsional action during engagement of the blades with the hog sufficient to substantially conform with the outer surface of such hog regardless of the uneven surface configuration of the same.

References Cited in the file of this patent

UNITED STATES PATENTS

| | | |
|---|---|---|
| 938,761 | Gussenhoven | Nov. 2, 1909 |
| 965,293 | Gussenhoven | July 26, 1910 |
| 1,352,576 | Brecht et al. | Sept. 14, 1920 |
| 1,502,749 | Schmidt | July 29, 1924 |